Feb. 5, 1957  B. T. HENSGEN  2,779,968
FRANKFURTER SKINNING MACHINE
Filed July 27, 1953  4 Sheets-Sheet 1
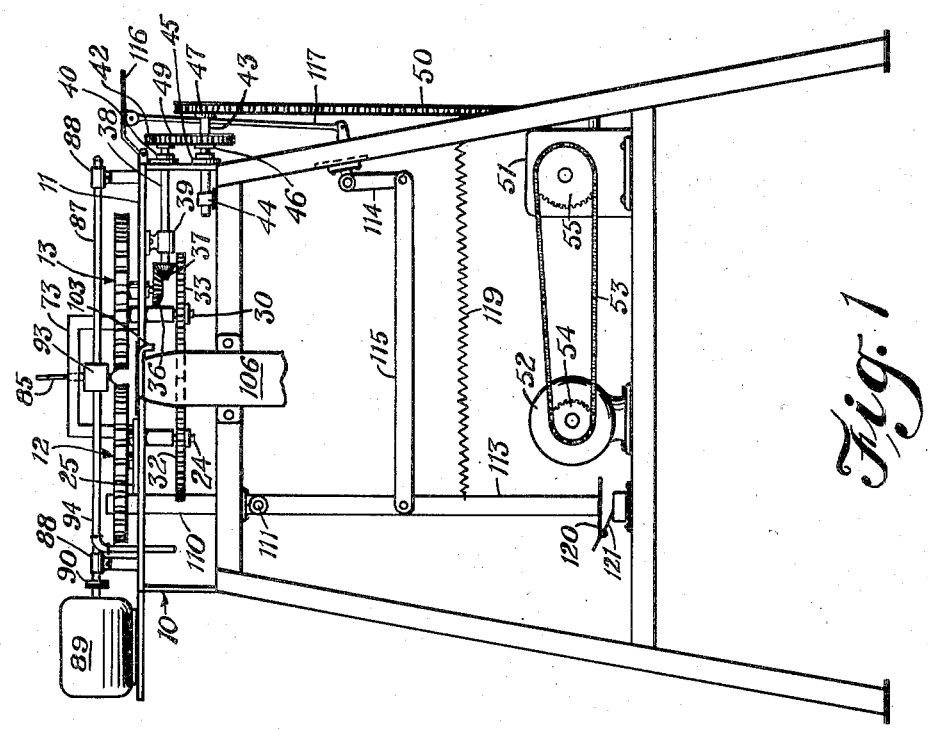
INVENTOR.
BERNARD T. HENSGEN
BY R. L. Story
ATTORNEY Feb. 5, 1957 B. T. HENSGEN 2,779,968
FRANKFURTER SKINNING MACHINE
Filed July 27, 1953 4 Sheets-Sheet 2

INVENTOR.
BERNARD T. HENSGEN
BY R. L. Story
ATTORNEY

Feb. 5, 1957 B. T. HENSGEN 2,779,968
FRANKFURTER SKINNING MACHINE
Filed July 27, 1953 4 Sheets-Sheet 3

INVENTOR.
BERNARD T. HENSGEN
BY R. L. Story
ATTORNEY

Feb. 5, 1957 B. T. HENSGEN 2,779,968
FRANKFURTER SKINNING MACHINE
Filed July 27, 1953 4 Sheets-Sheet 4

INVENTOR.
BERNARD T. HENSGEN
BY R. L. Story
ATTORNEY

United States Patent Office 2,779,968
Patented Feb. 5, 1957

2,779,968
FRANKFURTER SKINNING MACHINE

Bernard T. Hensgen, Chicago, Ill., assignor to Swift & Company, Chicago, Ill., a corporation of Illinois Application July 27, 1953, Serial No. 370,380

7 Claims. (Cl. 17—1)

The present invention relates to an apparatus for removing casings from sausages.

In the meat industry there is a tremendous demand for an apparatus to automatically remove the casings from sausages such as frankfurters which are generally sold in the form referred to as skinless. This demand stems from the fact that with such a product there is a substantial labor cost involved in performing this operation. Various problems confronted those seeking to satisfy this demand.

One of these problems is caused by the fact that in the majority of instances the frankfurters are not of uniform size. Often the casings in which the frankfurters are formed vary in size. In other instances the pressure of the comminuted mixture as it is stuffed into the casing in the forming of the sausage will vary from one point to another with a result that the casing at certain points will be distended more than at other points.

Another factor is that there is a tendency for the casing to adhere to the frankfurter making it difficult to strip from the sausage. Naturally the stripping of the casing cannot be done violently inasmuch as this would injure the sausage making it much less marketable.

The principal object of the instant invention is to produce a casing removing device that will solve the foregoing problems and do the job required of it despite the existence of these problems.

One of the features of the invention is the clutch provision to facilitate the starting of a string of sausages through the machine. This clutch is also very valuable to enable the operator to immediately stop the machine should a malfunction occur such as that caused by a break in the casing and to enable the operator to stop the feeding of the sausages before any substantial damage has occurred to the product.

Further objects and advantages will become apparent from the following description taken in conjunction with the drawings, in which:

Figure 1 is a front elevation of an embodiment of the invention;

Figure 2 is a side elevation of the embodiment of Figure 1;

Figure 4:
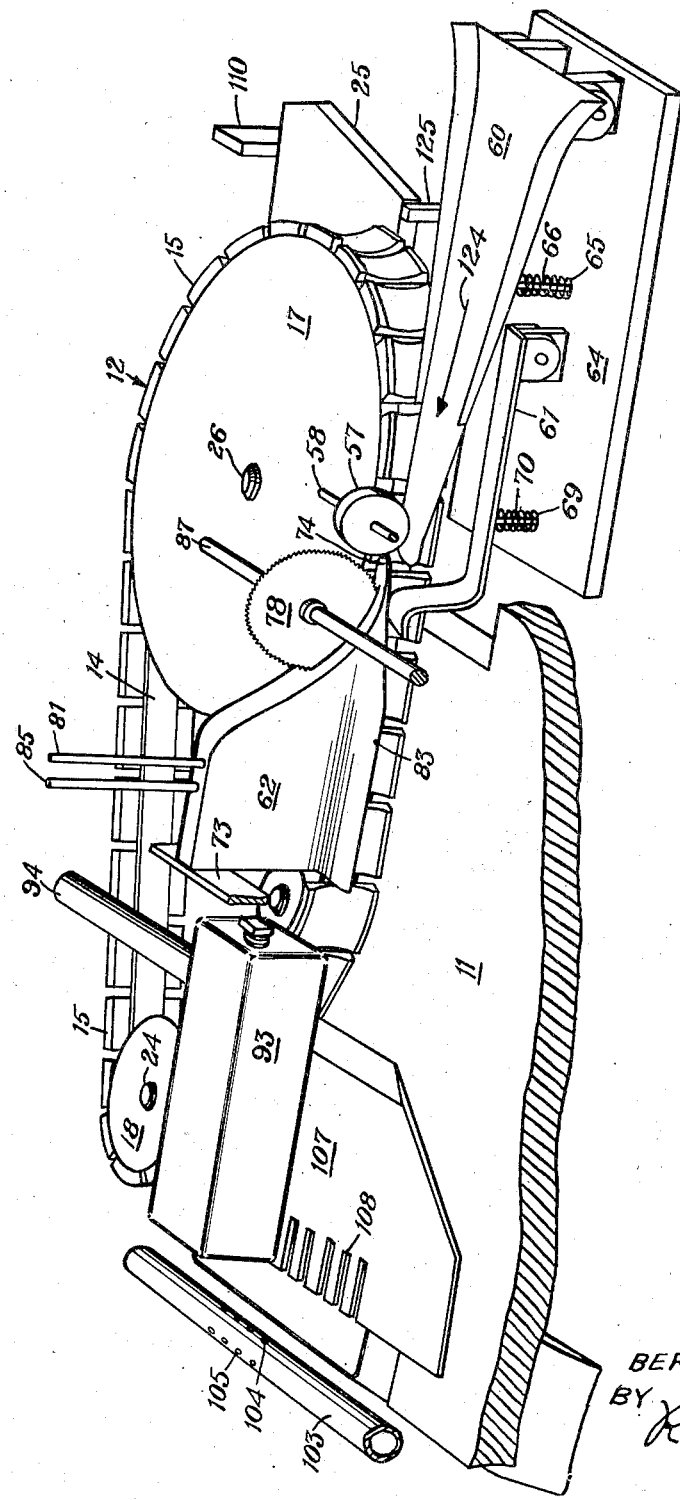
Figure 4 is a perspective view on an enlarged scale of the portion of the top of the embodiment of Figure 1.

The device comprises a frame 10 having a top plate 11. The frankfurters are moved through the machine by a pair of belts generally 12 and 13. The structure of the belts is best seen in Figure 4. Each comprises a continuous flexible backing strip 14 on which are mounted a plurality of rubber gripping segments 15.

Belt 12 rotates about three pulleys 17, 18 and 19, respectively, while belt 13 is mounted on three similar pulleys 20, 21 and 22, respectively. Shaft 24 to which pulley 18 is attached is journaled in plate 11. A subframe 25 is pivotally mounted about shaft 24 and rests on top plate 11. Shafts 26 and 27 are secured to subframe 25. Pulleys 17 and 19 are rotatably mounted on shafts 26 and 27, respectively. Shafts 29, 30, and 31 on which pulleys 20, 21 and 22, respectively, are mounted are each supported by the top plate 11. Shaft 31 is secured to the top plate with pulleys 22 being rotatably mounted on the shaft. Shafts 29 and 30 are journaled in the top plate 11 with pulleys 20 and 21, respectively, being secured to the shafts.

Below plate 11 a gear 32 secured to shaft 24 engages and is driven by a gear 33 on shaft 30. A bevel gear 36 is attached to the lower end of shaft 29. Bevel gear 36 is driven by a second bevel gear 37 secured to the end of shaft 38 mounted in suitable bearings 39 and 40. The other end of shaft 38 carries a sprocket 42. An idler shaft 43 mounted in bearings 44 and 45 has two sprockets 46 and 47 attached thereto. Sprocket 46 is connected to sprocket 42 by means of a chain 49. Sprocket 47 is connected by means of a chain 50 to a sprocket (not shown) on the output shaft of a speed reducer 51. Speed reducer 51 is driven from a motor 52 by chain 53 mounted on sprockets 54 and 55.

From the foregoing it will be apparent that in one plane the sausages are positioned by the two belts 12 and 13 which drive the sausages through the machine. In a transverse plane the sausages are positioned by wheel 57 rotatably mounted on a shaft 58 secured to an upstanding portion 59 of the frame 10, together with a pair of supporting members 60 and 61, to see that the strings of sausages move onto and across the plow generally 62 in proper position.

Each of supporting members 60 and 61 have one end pivotally secured to a plate member 64 of frame 10. Supporting member 60 is urged upwardly by a spring 65 surrounding a rod 66. Rod 66 passes through an opening in plate 64 and the lower end of the rod is threaded to receive a nut 67 which limits the upward movement of the supporting member by contact with the lower surface of plate 64. The nut provides an adjustment in the extent to which the supporting member 60 will be raised when frankfurters are not passing through the machine. Similarly supporting member 61 is urged upwardly by a spring 69 surrounding a rod 70. The lower end of rod 70 is also threaded with a nut 71 on the bottom of the rod being used to limit the upward movement of supporting member 61.

Figure 6:
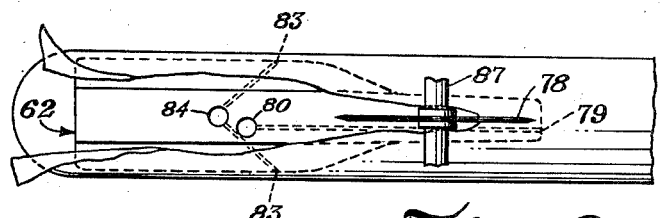
Figure 6 is a plan view of the plow and knife.
Figure 5:
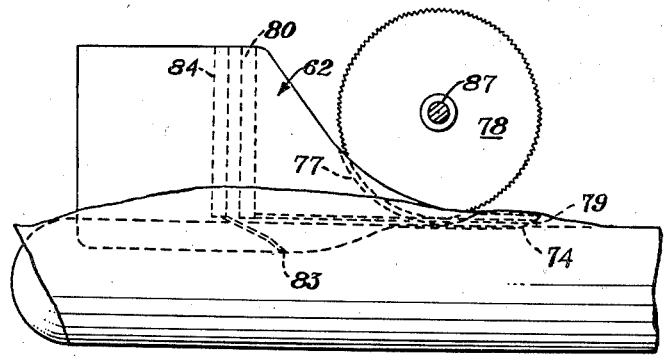
Figure 5 is a side elevation of the plow and cutting knife.
Figure 7:
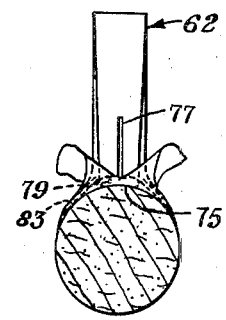
Figure 7 is a front view of the plow alone showing the manner in which it fits about a sausage.

Plow 62 is attached to a U-shaped bracket 73 fastened to the top of plate 11. The plow has a relatively slender, tapered nose 74, the shape of which is best seen in Figures 5, 6, and 7. The bottom portion 75 of particularly the forwardly end of the plow 62 with respect to the direction of travel of the sausages is curved to fit the general contour of the sausages, as seen in Figure 7. A slot 77 to the rear of the nose of the plow is formed to receive the cutting knife 78.

In the nose 74 of the plow is a fluid jet opening 79 through which an air blast is directed. Opening 79 communicates with a cross-passage 80 through which air under pressure is fed to the jet from a pipe 81 leading to a suitable source of air pressure (not shown). Forwardly of the point at which the casing is cut by the knife 78 the plow 62 has a fluid jet opening 83 in each side thereof. Jet openings 83 are positioned to direct a fluid blast outwardly against the inner side of the casing to further the stripping of the casing from the sausage. Each of the jet openings 83 communicates with a cross-passage 84 which in turn is supplied with air under pressure from a pipe 85.

Knife 78 is secured to a shaft 87 journaled in a pair of bearings 88. Shaft 87 is driven by a motor 89 through a flexible coupling 90. Preferably knife 78 has a serrated edge as illustrated in the drawings.

Figure 8:
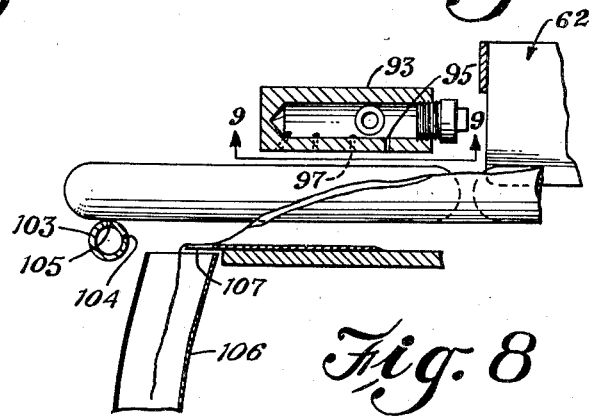
Figure 8 is an elevational section showing the blast stripping structure immediately to the rear of the plow.
Figure 9:
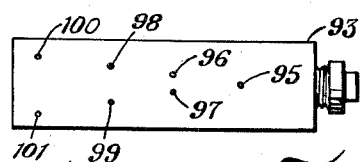
Figure 9 is an enlarged view of the underside of the blast stripper head as viewed along the line 9—9 of Figure 8c.

To the rear of plow 62 is a stripping head 93. As seen in Figure 8 the interior of the stripping head is hollow with air being supplied to the interior under pressure through a pipe 94 threaded into one side wall of the head. The bottom of the head has a plurality of jet openings to continue the stripping of the casing from the sausage. The first of these openings, starting with the rearward or entering end as the sausage is moved past the head 93, is a single opening 95 in a position directly over the sausage. The second are a pair of openings 96 and 97 each a short distance to either side of the longitudinal axis of the frankfurter. The next openings in sequence are the pair 98 and 99 spaced a slightly greater distance to each side of the axis of the frankfurter while the forward openings 100 and 101 are even farther to each side.

Each of these openings is the external terminus of a passage communicating with the hollow interior of the head 93. As will be seen in Figure 8 the passages forming openings 100 and 101 slope forwardly, that is in the direction of movement of the frankfurters through the machine to give the air blast therefrom a forwardly component. Preferably these same two passages also slope outwardly, as do the passages forming openings 96—99, thus giving the air blast from the openings an outward component, i. e. a component away from the central axis of the frankfurters to facilitate the stripping of the casings from the frankfurters.

To the rear of head 50 is a further stripping head formed of a pipe 103 having a series of openings 104 to direct a blast of air across the underside of the frankfurters to break any adhesion between the bottom surface of the frankfurt and the casing. The frankfurters ride across the top of pipe 103 while the casings drop down in front of the pipe. To enable the frankfurters to ride smoothly over the pipe 103 an air blast is directed upwardly through openings 105 in the pipe. The interior of the pipe communicates with a suitable source of air under pressure (not shown).

In front of pipe 103 is a vacuum, casing disposal, member 106. It is connected to a source of vacuum with a suitable trap to extract the casings from the vacuum line, neither of which are shown. Overlying the forward edge of the vacuum member 106 is a comb 107 formed of a plate having a series of slots 108 therein. The comb greatly aids in drawing the casing away from the frankfurter and down into the vacuum member 106.

A lever 110 is secured to a shaft 111 for pivotal movement with the upper end of the lever 110 being held in contact with subframe 25 by a spring 112 attached to subframe 25 and to lever 110. Extending downwardly from, and attached to, shaft 111 is a second lever 113. Lever 113 is connected to a crank 114 by means of a connecting rod 115. An actuating plate 116 is also secured to crank 114 by means of a connecting rod 117. As seen in Figure 1, lever 113 is urged in a counterclockwise direction by a spring 119. A shoe 120 on the bottom end of lever 113 is positioned to contact the actuating lever 121 of a switch 122 when the lever 113 is moved in a clockwise direction to the position shown in the drawings. Switch 122 is used to control the power to motors 52 and 89.

In commencing the operation of the machine the lever 113 is rotated in its counterclockwise position under the urging of spring 119. As a result, shoe 120 is out of contact with actuating lever 121 of switch 122 and the two motors 52 and 89 are disconnected from the source of electrical power. Also, lever 110 is rotated in its counterclockwise position allowing spring 112 to move subframe 25 in a counterclockwise position from that shown in Figure 3, thus opening up the space between the two belts 12 and 13. The operator starts one end of the length of frankfurters, from which the linking strings have previously been removed, over the nose 74 of plow 62. The forward end of the frankfurters, considering the direction of movement of the frankfurters through the machine as indicated by arrow 124, is held against the bottom 75 of plow 62 by supporting member 61. As a sausage approaches plow 62 one side of the sausage is positioned along a definite line by contact with wheel 57. Supporting member 60 urges the sausage upwardly against wheel 57.

Figure 3:
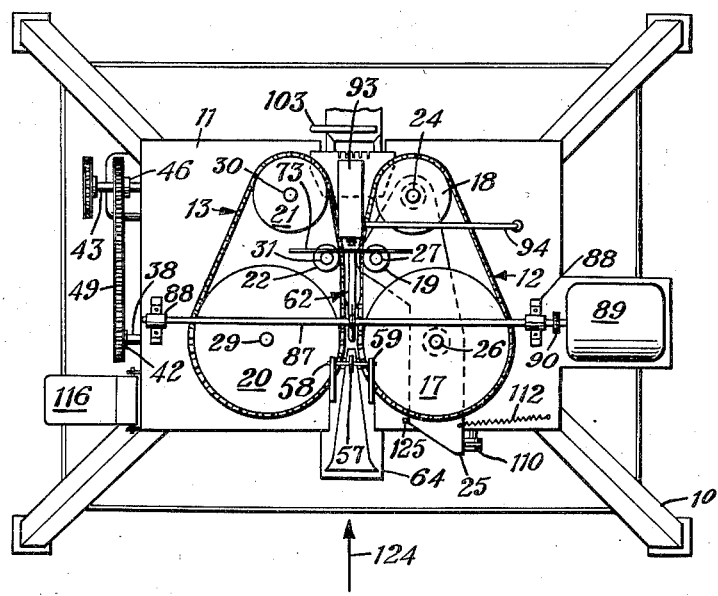
Figure 3 is a plan view of the embodiment of Figure 1.

Having started the string of sausages into the machine, the operator presses down on actuating plate 116 thus swinging lever 113 in a clockwise direction. The movement of lever 113 rotates lever 110 also in a clockwise direction (Figure 1) to push subframe 25 in a clockwise direction (Figure 3) to cause the sausage to be gripped between belts 12 and 13. The extent of movement of subframe 25 is limited by the setting of an adjustable stop 125 which is secured to the top plate 11 of the frame in the path of movement of the subframe 25 (Figures 3 and 4). At the same time shoe 120 actuates switch 122 to start he motors. The rotation of the belts draws the string of sausages along underneath plow 62. The belts also serve to position the sausage below the plow 62.

It will be apparent from the preceding description that the power is applied to belt 13 through bevel gears 36 and 37 and pulley 20. Belt 13 drives pulley 21 which in turn drives the two gears 33 and 32. Pulley 18 rotates with gear 32 by reason of the common connection of the two on shaft 24.

The use of the two pressure plates 60 and 61 is important in the proper positioning of the sausages with respect to the plow 62. Where there are two consecutive sausages in a string that vary substantially in size the supporting member 61 holds the first of these sausages into proper position on the plow 62 for cutting and stripping while at the same time the following sausage is properly positioned for entry onto the plow by being held against wheel 57 by supporting member 60. The air blast from opening 79 in the nose 74 of the plow acts to raise the casing slightly ahead of the nose of the plow thus facilitating the entry of the nose of the plow along underneath the top of the casing. As the casing moves past knife 78 it is cut with the two sides of the cut casing being pushed away from the sausage by air blasts from openings 83 and by contact with the sides of the plow. The air blasts from stripping head 93 and from pipe 103 further separate the casing from the sausage with the casing being drawn down through vacuum member 106. The sausages pass over the top of pipe 103 into a suitable receptacle (not shown).

The foregoing description of a specific embodiment is for the purpose of compliance with 35 U. S. C. 112, and I do not desire to be limited to the exact details shown and described, for obvious modifications will occur to a person skilled in the art.

I claim:

1. A device for stripping the casings from lengths of linked sausages from which the linking strings have been removed, said device including a first slitting and stripping means and a second positioning and feeding means operatively associated with said first means, said second means comprising power driven gripping means positioned in a first plane to engage the lengths of linked sausages and feed them to the first means in a given direction, a pressure means positioned in a second plane angularly disposed with respect to said first plane, said pressure means including a pair of supporting members positioned sequentially along said length of linked sausages, one of said members being opposite said first means, said supporting members being resiliently urged against said lengths of sausages engaged by said gripping means, and a rotary member in said second plane at the opposite side of said lengths of sausages from a second of said supporting members and rearwardly of said first means to align the opposite side of said sausages, said first means being positioned generally in said second plane and at said opposite side of said lengths of sausages.

2. A device for stripping the casings from lengths of linked sausages from which the linking strings have been removed, said device including a first slitting and stripping means and a second positioning and feeding means operatively associated with said first means, said second means comprising power driven gripping means positioned in a first plane to engage the lengths of linked sausages and feed them to the first means, said gripping means including a pair of endless belts each mounted on a pair of circular means, said circular means providing adjacent runs of each belt, the run of one belt being spaced from and generally parallel to the run of the other belt whereby the lengths of sausages will pass between said runs and be gripped between said belts, means operatively associated with one of said belts to move said run of one of said belts away from the run of the other of the belts whereby the grip of the belts on the length of sausages may be released, a pressure means positioned in a second plane angularly disposed with respect to said first plane, said pressure means being resiliently urged against said lengths of sausages engaged by said gripping means, and a rotary member in said second plane at the opposite side of said lengths of sausages from said pressure means to align the opposite side of said sausages, said first means being positioned generally in said second plane and at said opposite side of said lengths of sausages.

3. A device for stripping the casings from lengths of linked sausages from which the linking strings have been removed, said device including a first slitting and stripping means and a second positioning and feeding means operatively associated with said first means, said second means comprising power driven gripping means positioned in a first plane to engage the lengths of linked sausages and feed them to the first means in a given direction, said gripping means including a pair of endless belts each mounted on a pair of circular means, said circular means positioning a portion of each belt at a spaced distance from and generally parallel to the respective portion of the other belt whereby the lengths of sausages will pass between said portions and be gripped between said belts, a pressure means positioned in a second plane angularly disposed with respect to said first plane, said pressure means including a pair of supporting members positioned sequentially along said length of linked sausages, one of said members being opposite said first means, said supporting members being resiliently urged against said lengths of sausages engaged by said gripping means, and a rotary member in said second plane at the opposite side of said lengths of sausages from a second of said supporting members and rearwardly of said first means to align the opposite side of said sausages, said first means being positioned generally in said second plane and at said opposite side of said lengths of sausages.

4. A device for stripping the casings from lengths of linked sausages from which the linking strings have been removed, said device including a first slitting and stripping means and a second positioning and feeding means operatively associated with said first means to move said lengths of sausages to said first means in a given direction with a side of the sausages positioned along a given line, said first means comprising a plow member having a projecting nose positioned generally along said line and pointed in the opposite of said direction whereby the nose will project between the sausages and the casings, knife means intersecting said plow immediately to the rear of the nose to cut the casings as they move past a given point on the plow, said plow having an air blast opening in the nose directed away from the nose to raise the casings from the sausages ahead of the nose of the plow, said plow having air blast openings spaced in said direction from said given point and directed outwardly from said plow to further peel said casings from said sausages, said second means comprising power driven gripping means positioned in a first plane to engage the lengths of linked sausages and feed them to the first means in a given direction, a pressure means positioned in a second plane angularly disposed with respect to said first plane, said pressure means including a pair of supporting members positioned sequentially along said length of linked sausages, one of said members being opposite said first means, said supporting members being resiliently urged against said lengths of sausages engaged by said gripping means, and a rotary member in said second plane at the opposite side of said lengths of sausages from a second of said supporting members and rearwardly of said first means to align the opposite side of said sausages, said first means being positioned generally in said second plane and at said opposite side of said lengths of sausages.

5. A device for stripping the casings from lengths of linked sausages from which the linking strings have been removed, said device including a first slitting and stripping means and a second positioning and feed means operatively associated with said first means to move said lengths of sausages to said first means in a given direction with a side of the sausages positioned along a given line, said first means comprising a plow member having a projecting nose positioned generally along said line and pointed in the opposite of said direction whereby the nose will project between the sausages and the casings, knife means intersecting said plow immediately to the rear of the nose to cut the casings as they move past a given point on the plow, said plow having an air blast opening in the nose directed away from the nose to raise the casings from the sausages ahead of the nose of the plow, said plow having air blast openings spaced in said direction from said given point and directed outwardly from said plow to further peel said casings from said sausages, said second means comprising power driven gripping means positioned in a first plane to engage the lengths of linked sausages and feed them to the first means in a given direction, said gripping means including a pair of endless belts each mounted on a pair of circular means, said circular means, positioning a portion of each belt at a spaced distance from and generally parallel to the respective portion of the other belt whereby the lengths of sausages will pass between the portions and be gripped between said belts, a pressure means positioned in a second plane angularly disposed with respect to said first plane, said pressure means including a pair of supporting members positioned sequentially along said length of linked sausages, one of said members being opposite first means, said supporting members being resiliently urged against said lengths of sausages engaged by said gripping means, and a rotary member in said second plane at the opposite side of said lengths of sausages from a second of said supporting members and rearwardly of said first means to align the opposite side of said sausages, said first means being positioned generally in said second plane and at said opposite side of said lengths of sausages.

6. A positioning device for use with a linked sausage slitting and stripping machine, which machine includes a first slitting and stripping means and a second positioning and feeding means operatively associated with said first means, said second means comprising power driven gripping means positioned in a first plane to engage the lengths of linked sausages and feed them to the first means in a given direction, and a rotary member positioned in a second plane angularly disposed with respect to said first plane and at a side of said lengths of sausages, said first means being positioned generally in said second plane and at said side of said lengths of sausages, said device comprising a pressure means positioned in said second plane at the opposite side of said lengths of sausages from said rotary member, said pressure means including a pair of supporting members positioned sequentially along said length of linked sausages, the second of said supporting members with respect to the direction of movement of the sausages being opposite said first means, the other of said supporting members being opposite said rotary member and being positioned rearwardly of said first means.

7. A device for stripping the casings from lengths of linked sausages from which the linking strings have been removed, said device including a first slitting and stripping means and a second positioning and feeding means operatively associated with said first means, said second means comprising power driven gripping means positioned in a first plane to engage the lengths of linked sausages and feed them to the first means in a given direction, said gripping means including a pair of endless belts each mounted on a pair of circular means, said circular means providing adjacent runs of each belt, the run of one belt being spaced from and generally parallel to the run of the other belt whereby the lengths of sausages will pass between said runs and be gripped between said belts, means operatively associated with one of said belts to move said run of one of said belts away from the run of the other of the belts whereby the grip of the belts on the length of sausages may be released, a pressure means positioned in a second plane angularly disposed with respect to said first plane, said pressure means including a pair of supporting members positioned sequentially along said length of linked sausages, one of said members being opposite said first means, said supporting members being resiliently urged against said lengths of sausages engaged by said gripping means, and a rotary member in said second plane at the opposite side of said lengths of sausages from a second of said supporting members and rearwardly of said first means to align the opposite side of said sausages, said first means being positioned generally in said second plane and at said opposite side of said lengths of sausages.

References Cited in the file of this patent
UNITED STATES PATENTS

| | | |
|---|---|---|
| 2,340,755 | Jacobson | Feb. 1, 1944 |
| 2,369,360 | Martin | Feb. 13, 1945 |
| 2,406,163 | Prohaska | Aug. 20, 1946 |
| 2,424,346 | Wilcoxon | July 22, 1947 |
| 2,434,316 | Golden et al. | Jan. 13, 1948 |
| 2,623,237 | Schaller | Dec. 30, 1952 |
| 2,644,979 | Ball | July 14, 1953 |